No. 671,719.　　　　　　　　　　　　　　　　　　　Patented Apr. 9, 1901.
H. P. COLEMAN.
COMPENSATING GEAR.
(Application filed May 11, 1900.)

(No Model.)

Witnesses.
C. S. Marsh.
James E. Arnold

Inventor.
Horace P. Coleman.
By Arnold & Barlow.
Attorneys

UNITED STATES PATENT OFFICE.

HORACE P. COLEMAN, OF PROVIDENCE, RHODE ISLAND.

COMPENSATING GEAR.

SPECIFICATION forming part of Letters Patent No. 671,719, dated April 9, 1901.

Application filed May 11, 1900. Serial No. 16,305. (No model.)

*To all whom it may concern:*

Be it known that I, HORACE P. COLEMAN, of Providence, in the county of Providence and State of Rhode Island, have invented certain new and useful Improvements in Compensating Gears for Motor-Carriage Axles; and I do hereby declare that the following is a full, clear, and exact description thereof, reference being had to the accompanying drawings, and to the letters of reference marked thereon, which form a part of this specification.

This invention relates to compensating gears for motor-carriages and to the manner of connecting the two parts of the axle that has been divided to allow one of the wheels to turn at a different speed from the other wheel.

The object of this invention is to provide means to resist the end strain of the two divisions of the axle which causes the gears that connect the two parts to separate and prevent their engagement with each other. It is fully explained and illustrated in this specification and the annexed drawings.

Figure 1:
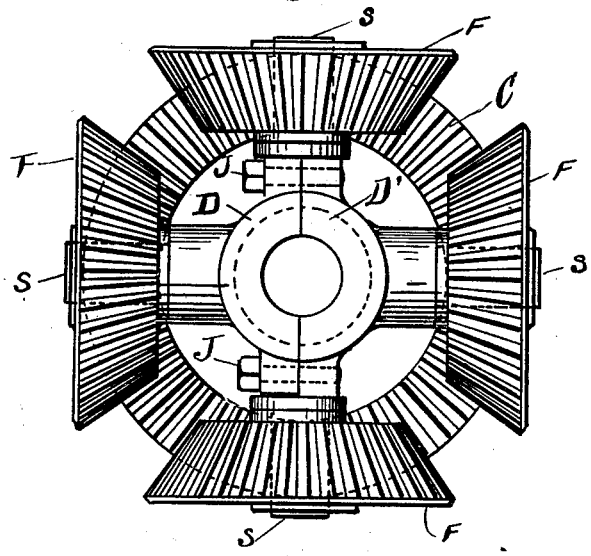
Figure 2:
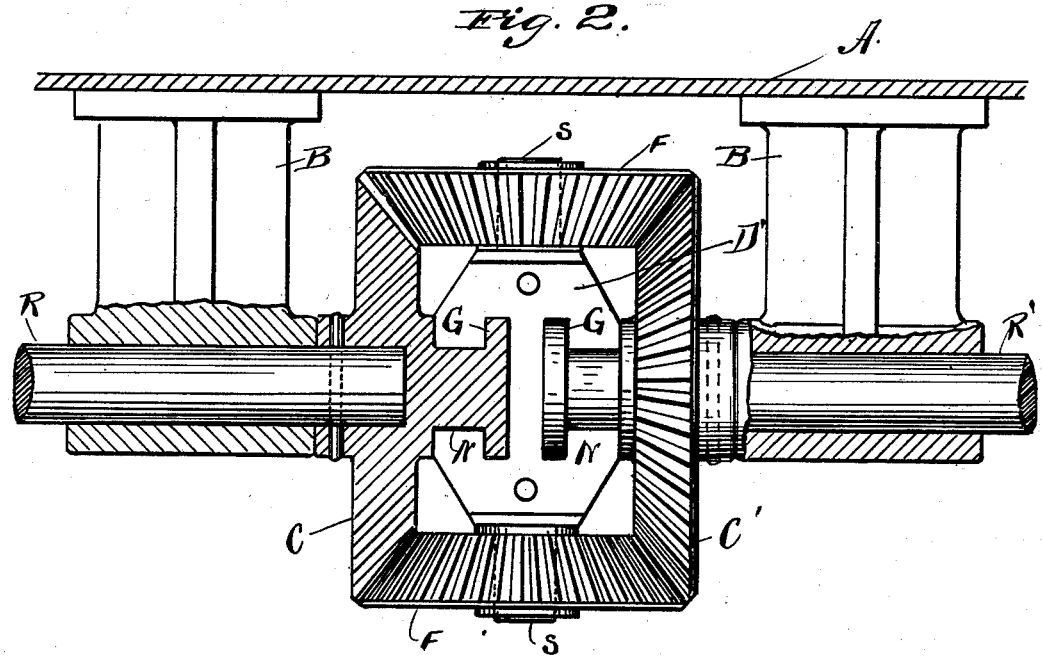

Figure 1 represents the connecting-gears of a divided axle, one of the parts of the axle, with its gear, having been removed. Fig. 2 is an elevation of the inner end of the parts of a divided axle with the bevel-gears attached and two of the four intermediate gears held on studs forming a part of the center block, one-half of the center block, with its stud and gear, having been removed to show how the hubs of the gears are journaled in the center block.

It is customary in motor-carriages and in other vehicles having the wheels fast on the axle, so as to turn with it, to divide the axle into two parts to allow one wheel to turn faster or slower than the other wheel in turning the vehicle or in driving around a circular track. These two divisions of the axle are usually connected together by differential gears that cause what one wheel loses in speed in going around the inner curve to be added to the speed of the wheel going around the outer curve, so that the power shall always be equally applied to the two wheels. To keep these gear-wheels always properly engaged, it is necessary to resist the great strain on the wheel on the outer curve to draw its parts of the axle outward and also the tendency of the bevel-gears to crowd apart and cause the gear-teeth to slip. This I accomplish in a great degree as follows:

In the drawings, A represents the frame of the carriage.

B B are the inner bearings of the two parts of the axle R R', and these bearings are held on hangers attached to the bottom A of the carriage.

A center block is made in two halves D and D'. The part D' (see Fig. 1) is provided on three of its sides with studs S, if there are four intermediate gears, as in the drawings, and the other half D has a stud S for the fourth intermediate gear and is made in the form of a cap to be held on the other half of the block D by means of the bolts J J. The bevel-gears C C' are made fast on the inner ends of the parts of the axle R R' by pinning or otherwise and have heads G G made on the ends of their inner hubs by making deep grooves N N in their peripheries, and corresponding recesses are milled out in the two opposite sides of the center block, (see Fig. 2,) into which the heads G and the necks connecting them to the gear or axle fit and turn easily. This addition of the surface of the inner side of the head G is added to that of the end of the bearing B and doubles the amount of wearing-surface opposed to the strain endwise on the two divisions of the axle, and so far lessens the chance of their wearing away and letting the gear-teeth slip. This positive hold of the heads insures the keeping of the gears in proper engagement, thereby lessening the chances of an accident.

The number of the intermediate gears used may be one or more, as may be preferred, as the number has no effect on the improvement.

Having thus described my improvements, I claim as my invention and desire to secure by Letters Patent—

In a connection for the inner ends of the divided axle, the combination of a revoluble center block made in two parts and secured together, one or more intermediate gears, held on said revoluble center block, gears, made fast on the inner ends of the two parts of the axle and having inwardly-projecting hubs with annular grooves made in them, the center block having recesses to receive said hubs with recesses, with the two parts of the axle, substantially as described.

In testimony whereof I have hereunto set my hand this 10th day of May, A. D. 1900.

HORACE P. COLEMAN.

In presence of—
BENJ. ARNOLD,
HOWARD E. BARLOW.